(12) United States Patent
Jing

(10) Patent No.: US 12,454,235 B1
(45) Date of Patent: Oct. 28, 2025

(54) AUXILIARY POWER MODULE CONTACTOR CONTROL FOR A VEHICLE

(71) Applicant: GM Global Technology Operations LLC, Detroit, MI (US)

(72) Inventor: Xin Jing, Pontiac, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 18/649,314

(22) Filed: Apr. 29, 2024

(51) Int. Cl.
| | |
|---|---|
| *B60R 16/033* | (2006.01) |
| *B60L 1/00* | (2006.01) |
| *B60L 50/60* | (2019.01) |
| *H01M 10/44* | (2006.01) |
| *H01M 10/46* | (2006.01) |
| *H02J 7/00* | (2006.01) |

(52) U.S. Cl.
CPC ............. *B60R 16/033* (2013.01); *B60L 1/00* (2013.01); *B60L 50/60* (2019.02); *H01M 10/443* (2013.01); *H01M 10/46* (2013.01); *H02J 7/0047* (2013.01); *H01M 2220/20* (2013.01)

(58) Field of Classification Search
CPC .......... B60R 16/033; B60L 1/00; B60L 50/60; H01M 10/443; H01M 10/46; H01M 2220/20; H02J 7/0047
USPC ......................................................... 307/9.1
See application file for complete search history.

(56) References Cited

U.S. PATENT DOCUMENTS 9,649,953 B2 * 5/2017 Schleser ................. B60L 15/20
2017/0257049 A1 * 9/2017 Jing ........................ H02P 27/08

* cited by examiner

*Primary Examiner* — Rexford N Barnie
*Assistant Examiner* — Swarna N Chowdhuri
(74) *Attorney, Agent, or Firm* — Vivacqua Crane, PLLC

(57) ABSTRACT

According to several aspects, a method for controlling an auxiliary power module (APM) contactor for a vehicle may include logging a plurality of actuations of the APM contactor within a time step. The plurality of actuations includes a plurality of auxiliary battery charging actuations and a plurality of accessory actuations. The method further may include comparing a quantity of the plurality of accessory actuations to a predetermined accessory actuation threshold. The method further may include restricting future actuations of the APM contactor in response to determining that the quantity of the plurality of accessory actuations is greater than or equal to the predetermined accessory actuation threshold.

15 Claims, 4 Drawing Sheets

AUXILIARY POWER MODULE CONTACTOR CONTROL FOR A VEHICLE

INTRODUCTION

The present disclosure relates to systems and methods for power system control for a vehicle.

To increase occupant comfort and vehicle performance, vehicles may be equipped with power storage and distribution systems which are configured to provide electrical power to various systems and components of the vehicle. Power storage and distribution systems may include rechargeable energy storage systems (RESS) and power electronics systems. The RESS may include high-voltage traction batteries which are configured to store large amounts of energy for use by propulsion systems (e.g., electric motors and/or hybrid-electric motors) of the vehicle and low-voltage auxiliary batteries which are configured to store smaller amounts of energy for use by vehicle accessories (e.g., vehicle lights, climate control systems, entertainment systems, security/alarm systems, and/or the like). The power electronics systems may include power conversion devices (e.g., auxiliary power modules (APM), DC/DC converters, and/or the like) and power switches for converting between high-voltage vehicle systems and the low-voltage vehicle systems. However, current vehicle power storage and distribution systems may not adequately mitigate wear and tear on power electronics system components due to frequent requests for power from vehicle accessories.

Thus, while current vehicle power storage and distribution systems and methods achieve their intended purpose, there is a need for a new and improved system and method for controlling an auxiliary power module (APM) contactor for a vehicle.

SUMMARY

According to several aspects, a method for controlling an auxiliary power module (APM) contactor for a vehicle is provided, the method may include logging a plurality of actuations of the APM contactor within a time step. The plurality of actuations includes a plurality of auxiliary battery charging actuations and a plurality of accessory actuations. The method further may include comparing a quantity of the plurality of accessory actuations to a predetermined accessory actuation threshold. The method further may include restricting future actuations of the APM contactor in response to determining that the quantity of the plurality of accessory actuations is greater than or equal to the predetermined accessory actuation threshold.

In another aspect of the present disclosure, logging each of the plurality of actuations of the APM contactor further may include detecting an actuation of the APM contactor. Logging each of the plurality of actuations of the APM contactor further may include incrementing a total actuation count variable in a non-transitory memory in response to detecting the actuation of the APM contactor. Logging each of the plurality of actuations of the APM contactor further may include categorizing the actuation of the APM contactor in response to detecting the actuation of the APM contactor. The actuation of the APM contactor is categorized as one of the plurality of auxiliary battery charging actuations or one of the plurality of accessory actuations. Logging each of the plurality of actuations of the APM contactor further may include incrementing an auxiliary battery charging actuation count variable in the non-transitory memory in response to categorizing the actuation of the APM contactor as one of the plurality of auxiliary battery charging actuations. The auxiliary battery charging actuation count variable stores a quantity of the plurality of auxiliary battery charging actuations. Logging each of the plurality of actuations of the APM contactor further may include incrementing an accessory actuation count variable in the non-transitory memory in response to categorizing the actuation of the APM contactor as one of the plurality of accessory actuations. The accessory actuation count variable stores the quantity of the plurality of accessory actuations.

In another aspect of the present disclosure, logging each of the plurality of actuations of the APM contactor further may include saving an actuation record in the non-transitory memory in response to categorizing the actuation of the APM contactor. The actuation record includes an actuation time and an actuation categorization.

In another aspect of the present disclosure, restricting future actuations of the APM contactor further may include predicting a period of high actuation frequency based at least in part on a plurality of actuation records in the non-transitory memory. Restricting future actuations of the APM contactor further may include actuating the APM contactor to an on-state at a beginning of the period of high actuation frequency. Restricting future actuations of the APM contactor further may include actuating the APM contactor to an off-state at an end of the period of high actuation frequency, such that the APM contactor is constantly in the on-state during the period of high actuation frequency.

In another aspect of the present disclosure, the method further may include determining a total actuation trend. The total actuation trend is a trend of a quantity of the plurality of actuations over multiple time steps. The method further may include comparing the total actuation trend to a predetermined total actuation threshold. The predetermined total actuation threshold includes a predetermined expected total actuation trend. The predetermined expected total actuation trend is determined based at least in part on an expected lifespan of the APM contactor and a maximum actuation quantity of the APM contactor. The method further may include restricting future accessory actuations and future auxiliary battery charging actuations in response to determining that the total actuation trend is greater than or equal to the predetermined expected total actuation trend.

In another aspect of the present disclosure, categorizing the actuation of the APM contactor further may include categorizing the actuation of the APM contactor as one of plurality of auxiliary battery charging actuations in response to determining that the APM contactor was actuated to charge an auxiliary battery of the vehicle. Categorizing the actuation of the APM contactor further may include categorizing the actuation of the APM contactor as one of the plurality of accessory actuations in response to determining that the APM contactor was not actuated to charge the auxiliary battery of the vehicle.

In another aspect of the present disclosure, comparing the quantity of the plurality of accessory actuations to the predetermined accessory actuation threshold further may include determining an accessory actuation trend. The accessory actuation trend is a trend of the quantity of the plurality of accessory actuations over multiple time steps. Comparing the quantity of the plurality of accessory actuations to the predetermined accessory actuation threshold further may include comparing the accessory actuation trend to the predetermined accessory actuation threshold. The predetermined accessory actuation threshold includes a predetermined expected accessory actuation trend. The predetermined expected accessory actuation trend is determined based at least in part on an expected lifespan of the APM contactor and a maximum actuation quantity of the APM contactor. Comparing the quantity of the plurality of accessory actuations to the predetermined accessory actuation threshold further may include determining the quantity of the plurality of accessory actuations to be greater than or equal to the predetermined accessory actuation threshold in response to determining that the accessory actuation trend is greater than or equal to the predetermined expected accessory actuation trend.

In another aspect of the present disclosure, the method further may include calculating a quantity of available auxiliary battery charging actuations within the time step based at least in part on the quantity of the plurality of accessory actuations, an expected lifespan of the APM contactor, and a maximum actuation quantity of the APM contactor. The method further may include estimating a quantity of estimated auxiliary battery charging actuations within the time step. The method further may include comparing the quantity of available auxiliary battery charging actuations to the quantity of estimated auxiliary battery charging actuations. The method further may include restricting future auxiliary battery charging actuations in response to determining that the quantity of available auxiliary battery charging actuations is less than the quantity of estimated auxiliary battery charging actuations.

In another aspect of the present disclosure, estimating the quantity of estimated auxiliary battery charging actuations within the time step further may include measuring a battery temperature of an auxiliary battery of the vehicle. Estimating the quantity of estimated auxiliary battery charging actuations within the time step further may include determining an estimated energy draw from the auxiliary battery during the time step. Estimating the quantity of estimated auxiliary battery charging actuations within the time step further may include determining an effective energy capacity of the auxiliary battery based at least in part on the battery temperature. Estimating the quantity of estimated auxiliary battery charging actuations within the time step further may include determining an estimated charge cycle of the auxiliary battery. The estimated charge cycle is characterized by a charge cycle duty cycle and a charge cycle period. Estimating the quantity of estimated auxiliary battery charging actuations within the time step further may include estimating the quantity of estimated auxiliary battery charging actuations within the time step based at least in part on the charge cycle duty cycle and the charge cycle period.

In another aspect of the present disclosure, restricting future auxiliary battery charging actuations further may include actuating the APM contactor to an on-state, such that the APM contactor is constantly in the on-state.

According to several aspects, a system for controlling an auxiliary power module (APM) contactor for a vehicle is provided. The system may include a traction battery, an APM contactor in electrical communication with the traction battery, an auxiliary battery, a low-voltage vehicle accessory, and an auxiliary power module (APM) in electrical communication with the APM contactor, the auxiliary battery, and the low-voltage vehicle accessory. The APM is configured to convert a high-voltage provided by the traction battery to a low-voltage for use by the auxiliary battery and the low-voltage vehicle accessory. The system further may include a controller in electrical communication with at least the APM contactor. The controller programmed to log a plurality of actuations of the APM contactor within a time step. The plurality of actuations includes a plurality of auxiliary battery charging actuations to charge the auxiliary battery and a plurality of accessory actuations to power the low-voltage vehicle accessory. The controller is further programmed to compare a quantity of the plurality of accessory actuations to a predetermined accessory actuation threshold. The controller is further programmed to restrict future actuations of the APM contactor in response to determining that the quantity of the plurality of accessory actuations is greater than or equal to the predetermined accessory actuation threshold.

In another aspect of the present disclosure, to log the plurality of actuations of the APM contactor, the controller is further programmed to detect an actuation of the APM contactor. To log the plurality of actuations of the APM contactor, the controller is further programmed to increment a total actuation count variable in a non-transitory memory in response to detecting the actuation of the APM contactor. To log the plurality of actuations of the APM contactor, the controller is further programmed to categorize the actuation of the APM contactor in response to detecting the actuation of the APM contactor. The actuation of the APM contactor is categorized as one of plurality of auxiliary battery charging actuations or one of the plurality of accessory actuations. To log the plurality of actuations of the APM contactor, the controller is further programmed to increment an auxiliary battery charging actuation count variable in the non-transitory memory in response to categorizing the actuation of the APM contactor as one of the plurality of auxiliary battery charging actuations. The auxiliary battery charging actuation count variable stores a quantity of the plurality of auxiliary battery charging actuations. To log the plurality of actuations of the APM contactor, the controller is further programmed to increment an accessory actuation count variable in the non-transitory memory in response to categorizing the actuation of the APM contactor as one of the plurality of accessory actuations. The accessory actuation count variable stores the quantity of the plurality of accessory actuations. To log the plurality of actuations of the APM contactor, the controller is further programmed to save an actuation record in the non-transitory memory in response to categorizing the actuation of the APM contactor. The actuation record includes an actuation time and an actuation categorization.

In another aspect of the present disclosure, to restrict future actuations of the APM contactor, the controller is further programmed to predict a period of high actuation frequency based at least in part on a plurality of actuation records in the non-transitory memory. To restrict future actuations of the APM contactor, the controller is further programmed to actuate the APM contactor to an on-state at a beginning of the period of high actuation frequency. To restrict future actuations of the APM contactor, the controller is further programmed to actuate the APM contactor to an off-state at an end of the period of high actuation frequency, such that the APM contactor is constantly in the on-state during the period of high actuation frequency.

In another aspect of the present disclosure, to compare the quantity of the plurality of accessory actuations to the predetermined accessory actuation threshold, the controller is further programmed to determine an accessory actuation trend. The accessory actuation trend is a trend of the quantity of the plurality of accessory actuations over multiple time steps. To compare the quantity of the plurality of accessory actuations to the predetermined accessory actuation threshold, the controller is further programmed to compare the accessory actuation trend to the predetermined accessory actuation threshold. The predetermined accessory actuation threshold includes a predetermined expected accessory actuation trend. The predetermined expected accessory actuation trend is determined based at least in part on an expected lifespan of the APM contactor and a maximum actuation quantity of the APM contactor. To compare the quantity of the plurality of accessory actuations to the predetermined accessory actuation threshold, the controller is further programmed to determine the quantity of the plurality of accessory actuations to be greater than or equal to the predetermined accessory actuation threshold in response to determining that the accessory actuation trend is greater than or equal to the predetermined expected accessory actuation trend.

In another aspect of the present disclosure, the controller is further programmed to calculate a quantity of available auxiliary battery charging actuations within the time step based at least in part on the quantity of the plurality of accessory actuations, an expected lifespan of the APM contactor, and a maximum actuation quantity of the APM contactor. The controller is further programmed to estimate a quantity of estimated auxiliary battery charging actuations within the time step. The controller is further programmed to compare the quantity of available auxiliary battery charging actuations to the quantity of estimated auxiliary battery charging actuations. The controller is further programmed to restrict future auxiliary battery charging actuations in response to determining that the quantity of available auxiliary battery charging actuations is less than the quantity of estimated auxiliary battery charging actuations.

In another aspect of the present disclosure, the system further includes an auxiliary battery temperature sensor in electrical communication with the controller. To estimate the quantity of estimated auxiliary battery charging actuations, the controller is programmed to measure a battery temperature of an auxiliary battery of the vehicle. To estimate the quantity of estimated auxiliary battery charging actuations, the controller is programmed to determine an estimated energy draw from the auxiliary battery during the time step. To estimate the quantity of estimated auxiliary battery charging actuations, the controller is programmed to determine an effective energy capacity of the auxiliary battery based at least in part on the battery temperature. To estimate the quantity of estimated auxiliary battery charging actuations, the controller is programmed to determine an estimated charge cycle of the auxiliary battery. The estimated charge cycle is characterized by a charge cycle duty cycle and a charge cycle period. To estimate the quantity of estimated auxiliary battery charging actuations, the controller is programmed to estimate the quantity of estimated auxiliary battery charging actuations within the time step based at least in part on the charge cycle duty cycle and the charge cycle period.

In another aspect of the present disclosure, to restrict future auxiliary battery charging actuations, the controller is further programmed to actuate the APM contactor to an on-state, such that the APM contactor is constantly in the on-state.

According to several aspects, a method for controlling an auxiliary power module (APM) contactor for a vehicle is provided. The method may include logging a plurality of actuations of the APM contactor within a time step. The plurality of actuations includes a plurality of auxiliary battery charging actuations and a plurality of accessory actuations. The method further may include comparing a quantity of the plurality of accessory actuations to a predetermined accessory actuation threshold. The method further may include restricting future actuations of the APM contactor in response to determining that the quantity of the plurality of accessory actuations is greater than or equal to the predetermined accessory actuation threshold. The method further may include calculating a quantity of available auxiliary battery charging actuations within the time step based at least in part on the quantity of the plurality of accessory actuations, an expected lifespan of the APM contactor, and a maximum actuation quantity of the APM contactor. The method further may include estimating a quantity of estimated auxiliary battery charging actuations within the time step. The method further may include comparing the quantity of available auxiliary battery charging actuations to the quantity of estimated auxiliary battery charging actuations. The method further may include restricting future auxiliary battery charging actuations in response to determining that the quantity of available auxiliary battery charging actuations is less than the quantity of estimated auxiliary battery charging actuations.

In another aspect of the present disclosure, comparing the quantity of the plurality of accessory actuations to the predetermined accessory actuation threshold further may include determining an accessory actuation trend. The accessory actuation trend is a trend of the quantity of the plurality of accessory actuations over multiple time steps. Comparing the quantity of the plurality of accessory actuations to the predetermined accessory actuation threshold further may include comparing the accessory actuation trend to the predetermined accessory actuation threshold. The predetermined accessory actuation threshold includes a predetermined expected accessory actuation trend. The predetermined expected accessory actuation trend is determined based at least in part on an expected lifespan of the APM contactor and a maximum actuation quantity of the APM contactor. Comparing the quantity of the plurality of accessory actuations to the predetermined accessory actuation threshold further may include determining the quantity of the plurality of accessory actuations to be greater than or equal to the predetermined accessory actuation threshold in response to determining that the accessory actuation trend is greater than or equal to the predetermined expected accessory actuation trend.

In another aspect of the present disclosure, estimating the quantity of estimated auxiliary battery charging actuations within the time step further may include measuring a battery temperature of an auxiliary battery of the vehicle. Estimating the quantity of estimated auxiliary battery charging actuations within the time step further may include determining an estimated energy draw from the auxiliary battery during the time step. Estimating the quantity of estimated auxiliary battery charging actuations within the time step further may include determining an effective energy capacity of the auxiliary battery based at least in part on the battery temperature. Estimating the quantity of estimated auxiliary battery charging actuations within the time step further may include determining an estimated charge cycle of the auxiliary battery. The estimated charge cycle is characterized by a charge cycle duty cycle and a charge cycle period. Estimating the quantity of estimated auxiliary battery charging actuations within the time step further may include estimating the quantity of estimated auxiliary battery charging actuations within the time step based at least in part on the charge cycle duty cycle and the charge cycle period.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In aspects of the present disclosure, battery electric vehicles (BEV), hybrid electric vehicles (HEV), and/or the like may include an auxiliary power module (APM) which is configured to provide power to low-voltage vehicle accessories and/or charge low-voltage auxiliary batteries. In aspects of the present disclosure, the APM may be energized/deenergized by an APM contactor, which is an electrical and/or electromechanical switch for interrupting flow of electrical current. However, the APM contactor may experience wear due to excessive switching cycles (i.e., actuations). Therefore, it is advantageous to prevent the APM contactor from exceeding switching cycle design limits. Accordingly, the present disclosure provides a new and improved system and method for control of an APM contactor for a vehicle.

Figure 1:
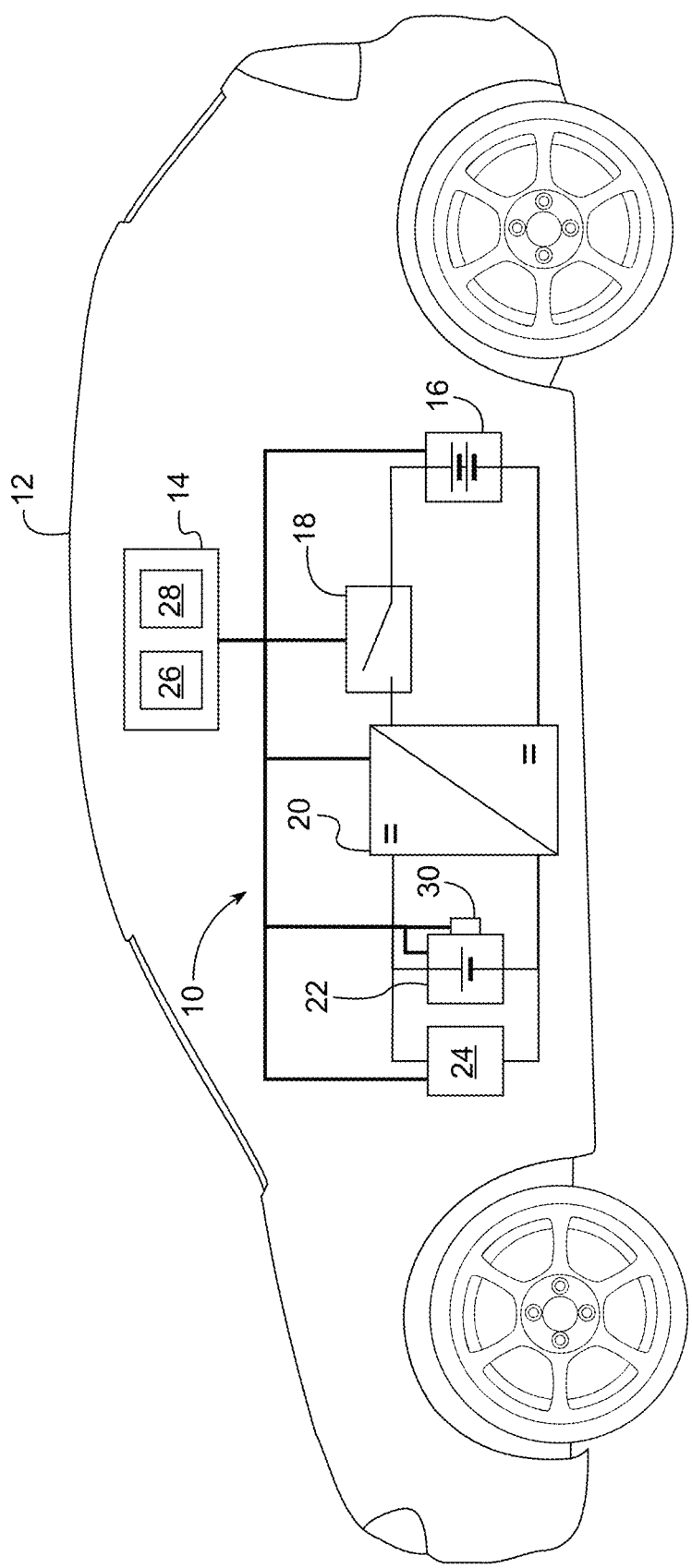
FIG. 1 is a schematic diagram of a system for controlling an auxiliary power module (APM) contactor for a vehicle, according to an exemplary embodiment.

Referring to FIG. 1, a system for controlling an auxiliary power module (APM) contactor for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a traction battery 16, an APM contactor 18, an auxiliary power module (APM) 20, an auxiliary battery 22, and a low-voltage vehicle accessory 24.

The controller 14 is used to implement a method 100 for controlling an auxiliary power module (APM) contactor for a vehicle, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions.

The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12.

The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with at least the APM contactor 18 and the auxiliary battery 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure. It should further be understood that, in the scope of the present disclosure, electrical communication also includes power and/or energy transfer between electrical devices (e.g., using conducting wires and/or wireless power transmission techniques).

The traction battery 16 stores and provides electrical energy in the form of direct current (DC) for propulsion and high-voltage (e.g., four hundred volts) power supply of vehicle systems. In an exemplary embodiment, the traction battery 16 includes a plurality of battery cells (e.g., lithium-ion battery cells) electrically connected in series and/or parallel to provide an increased voltage and/or current-carrying capacity. In a non-limiting example, the plurality of battery cells are housed in an enclosure configured to protect the plurality of battery cells from mechanical vibration, water intrusion, and dust intrusion. The enclosure is also configured to provide temperature regulation (e.g., using a liquid cooling system, a resistive heating system, and/or the like). In an exemplary embodiment, the traction battery 16 further includes a battery management system (BMS) configured to monitor battery characteristics such as a state of charge (SOC), state of health (SOH), temperature, and/or the like, and transmit the battery characteristics to the controller 14. In a non-limiting example, the BMS includes a BMS controller in electrical communication with a plurality of BMS sensors disposed within the enclosure of the traction battery 16. In an exemplary embodiment, the traction battery 16 provides a DC voltage across a positive and negative output terminal. The positive and negative output terminals are electrically connected to a high-voltage side of the APM 20 via the APM contactor 18, as will be discussed in greater detail below. In some embodiments, the controller 14 is in electrical communication with the traction battery 16, for example, to monitor the SOC of the traction battery 16.

The APM contactor 18 is used to connect/disconnect the APM 20 from the traction battery 16. In an exemplary embodiment, the APM contactor 18 is an electromechanical device designed to make or break electrical connections in circuits carrying high voltages. In a non-limiting example, the APM contactor 18 includes a set of contacts (not shown), an electromagnet (not shown), and a control circuit (not shown). The set of contacts includes movable and stationary contact points which can be brought together or separated by the electromagnet. The electromagnet generates a magnetic field when energized by the control circuit. The magnetic field attracts or repels the movable contact points, thereby actuating the APM contactor 18.

In operation, when the controller 14 sends a signal to the control circuit, the control circuit energizes the electromagnet and the contacts are closed, allowing electrical current to flow between the traction battery 16 and the APM 20. Conversely, when the control circuit de-energizes the electromagnet, the contacts are opened, interrupting the flow of current between the traction battery 16 and the APM 20. It should be understood that the APM contactor 18 may be realized using any electronically controllable switch, including relays, solid-state electronic switches (e.g., transistors), and/or the like without departing from the scope of the present disclosure. The APM contactor 18 is in electrical communication with the controller 14 as discussed above.

In an exemplary embodiment, due to mechanical degradation of the components of the APM contactor 18 (e.g., the set of contacts), the APM contactor 18 has a limited maximum actuation quantity. The maximum actuation quantity is a maximum number of times that the APM contactor 18 may be actuated (i.e., connected or disconnected) before electrical or mechanical failure of the APM contactor 18 is expected. By defining an expected lifespan of the APM contactor 18 (e.g., ten years), a nominal quantity of actuations permissible within a given time step (e.g., one day) may be calculated based on the maximum actuation quantity. The maximum actuation quantity and the expected lifespan are also referred to as APM contactor design limits.

The auxiliary power module (APM) 20 is used to convert the high-voltage power provided by the traction battery 16 into low-voltage power suitable for powering auxiliary systems of the vehicle 12. In an exemplary embodiment, the APM 20 is realized as a DC/DC converter such as, for example, a buck-boost converter, a buck converter, a single-ended primary inductance converter (SEPIC), and/or the like. It should be understood that the APM 20 may be realized using any circuit topology or architecture operable for DC-to-DC power conversion. In some embodiments, an operation of the APM 20, including, for example, an activation state, a duty cycle, a conversion ratio, a voltage setpoint, and/or the like is controllable by the controller 14 using electrical signals (e.g., analog and/or digital electrical signals). The APM 20 includes a high-voltage side configured to receive high-voltage power and a low-voltage side configured to output low-voltage power. The high-voltage side of the APM 20 is connected to the traction battery 16 via the APM contactor 18, such that the controller 14 may connect/disconnect the APM 20 from the traction battery 16, thus energizing/deenergizing the APM 20. The low-voltage side of the APM 20 is connected to the auxiliary battery 22 and the low-voltage vehicle accessory 24, as will be discussed in greater detail below. In some embodiments, the controller 14 is in electrical communication with the APM 20, for example, to monitor a power transmission of the APM 20 and/or control an operation of the APM 20.

The auxiliary battery 22 stores and provides electrical energy in the form of direct current (DC) for low-voltage (e.g., twelve volts) power supply of vehicle systems. In a non-limiting example, the auxiliary battery 22 is used to provide electrical energy to the low-voltage vehicle accessory 24 when the APM 20 is deenergized. In an exemplary embodiment, the auxiliary battery 22 includes one or more battery cells (e.g., lead-acid battery cells) electrically connected in series and/or parallel to provide an increased voltage and/or current-carrying capacity. In a non-limiting example, the one or more battery cells are housed in an enclosure configured to protect the one or more battery cells from mechanical vibration, water intrusion, and dust intrusion. The enclosure is also configured to provide temperature regulation (e.g., using a liquid cooling system, a resistive heating system, and/or the like). In an exemplary embodiment, the auxiliary battery 22 provides a DC voltage across a positive and negative output terminal. The positive and negative output terminals are electrically connected to the low-voltage side of the APM 20. In some embodiments, the controller 14 is in electrical communication with the auxiliary battery 22, for example, to monitor a power input/output of the auxiliary battery 22 and/or a state of charge (SOC) of the auxiliary battery 22.

In an exemplary embodiment, the controller 14 is in electrical communication with the auxiliary battery 22 to monitor a voltage of the auxiliary battery 22 and estimate a state of charge (SOC) of the auxiliary battery 22. If the SOC of the auxiliary battery 22 drops below a predetermined threshold (e.g., eighty percent), the controller 14 may use the APM contactor 18 to energize the APM 20 in order to charge the auxiliary battery 22, as will be discussed in greater detail below. In some embodiments, the auxiliary battery 22 further includes a charge controller configured to manage and regulate charging of the auxiliary battery 22.

The total amount of energy able to be stored in the auxiliary battery 22 is referred to as an effective energy capacity of the auxiliary battery 22. In an exemplary embodiment, the effective energy capacity of the auxiliary battery 22 varies with temperature due to, for example, temperature-dependent chemical and/or electrochemical processes or reactions within the auxiliary battery 22. Accordingly, in a non-limiting example, an amount of energy required to fully charge or fully discharge the auxiliary battery 22 is temperature dependent. Therefore, the auxiliary battery 22 further includes an auxiliary battery temperature sensor 30.

The auxiliary battery temperature sensor 30 is used to measure a temperature of the auxiliary battery 22. In a non-limiting example, the auxiliary battery temperature sensor 30 includes a sensing element and a signal conditioning circuit. The sensing element detects changes in temperature and converts them into electrical signals. In a non-limiting example, the sensing element includes a thermocouple and/or a thermistor. The signal conditioning circuit amplifies and processes the electrical signals produced by the sensing element to provide temperature information to the controller 14. The auxiliary battery temperature sensor 30 is in electrical communication with the controller 14 as discussed above.

Therefore, based on the temperature of the auxiliary battery 22 obtained using the auxiliary battery temperature sensor 30, the controller 14 may determine the effective energy capacity of the auxiliary battery 22 and thus determine an amount of energy needed to charge the auxiliary battery 22 based on the SOC of the auxiliary battery 22.

The low-voltage vehicle accessory 24 is used to provide additional features and/or functionality for the vehicle 12. In the scope of the present disclosure, the low-voltage vehicle accessory 24 includes any system and/or component of the vehicle 12 configured to operate using low-voltage (e.g., twelve volts) electrical power. When APM 20 is energized (i.e., the APM contactor 18 is closed) low-voltage vehicle accessory 24 the low-voltage vehicle accessory 24 is powered directly from the APM 20, drawing a negligent amount of energy from the auxiliary battery 22. When the APM 20 is deenergized (i.e., the APM contactor 18 is open), the low-voltage vehicle accessory 24 is powered from the energy stored in the auxiliary battery 22.

In a non-limiting example, the low-voltage vehicle accessory 24 includes one or more of: a vehicle communication system (i.e., a system allowing for vehicle-to-vehicle (V2V), vehicle-to-infrastructure (V2X), wireless local area networking (WLAN), and/or cellular data communication), a vehicle camera system (i.e., one or more cameras disposed in/on the vehicle 12, e.g., for security monitoring purposes), an alarm system, a battery heating/cooling system for the traction battery 16 and/or the auxiliary battery 22, a vehicle infotainment system, interior/exterior vehicle lights, a heating, ventilation, and air conditioning (HVAC) system, and/or the like. It should be understood that the low-voltage vehicle accessory 24 may include alternative and/or additional components without departing from the scope of the present disclosure. In some embodiments, the controller 14 is in electrical communication with the low-voltage vehicle accessory 24, for example, to monitor a power consumption of the low-voltage vehicle accessory 24 and/or control an operation of the low-voltage vehicle accessory 24.

Figure 2:
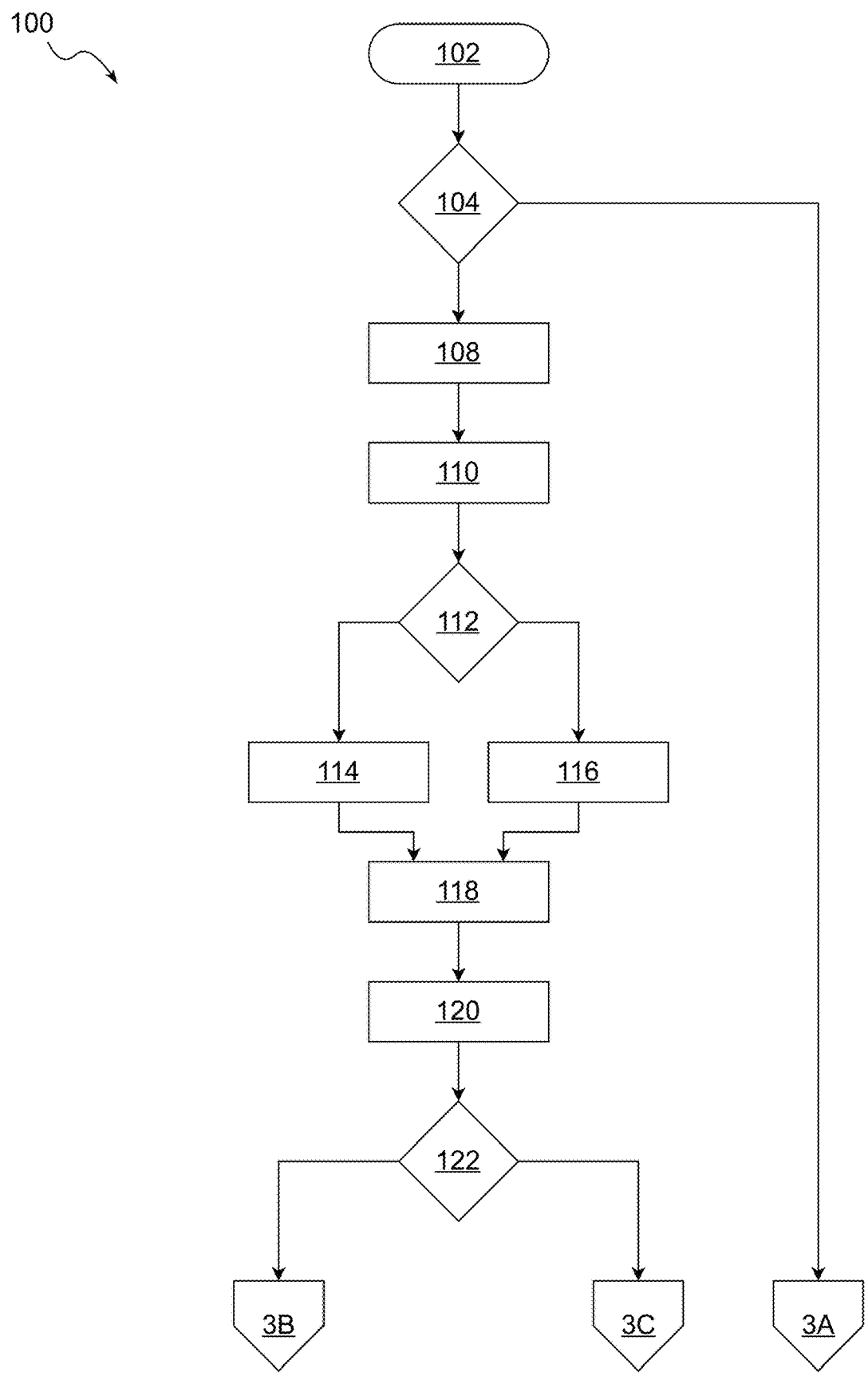
FIG. 2 is a flowchart of a method for controlling an auxiliary power module (APM) contactor for a vehicle, according to an exemplary embodiment.
Figure 3:
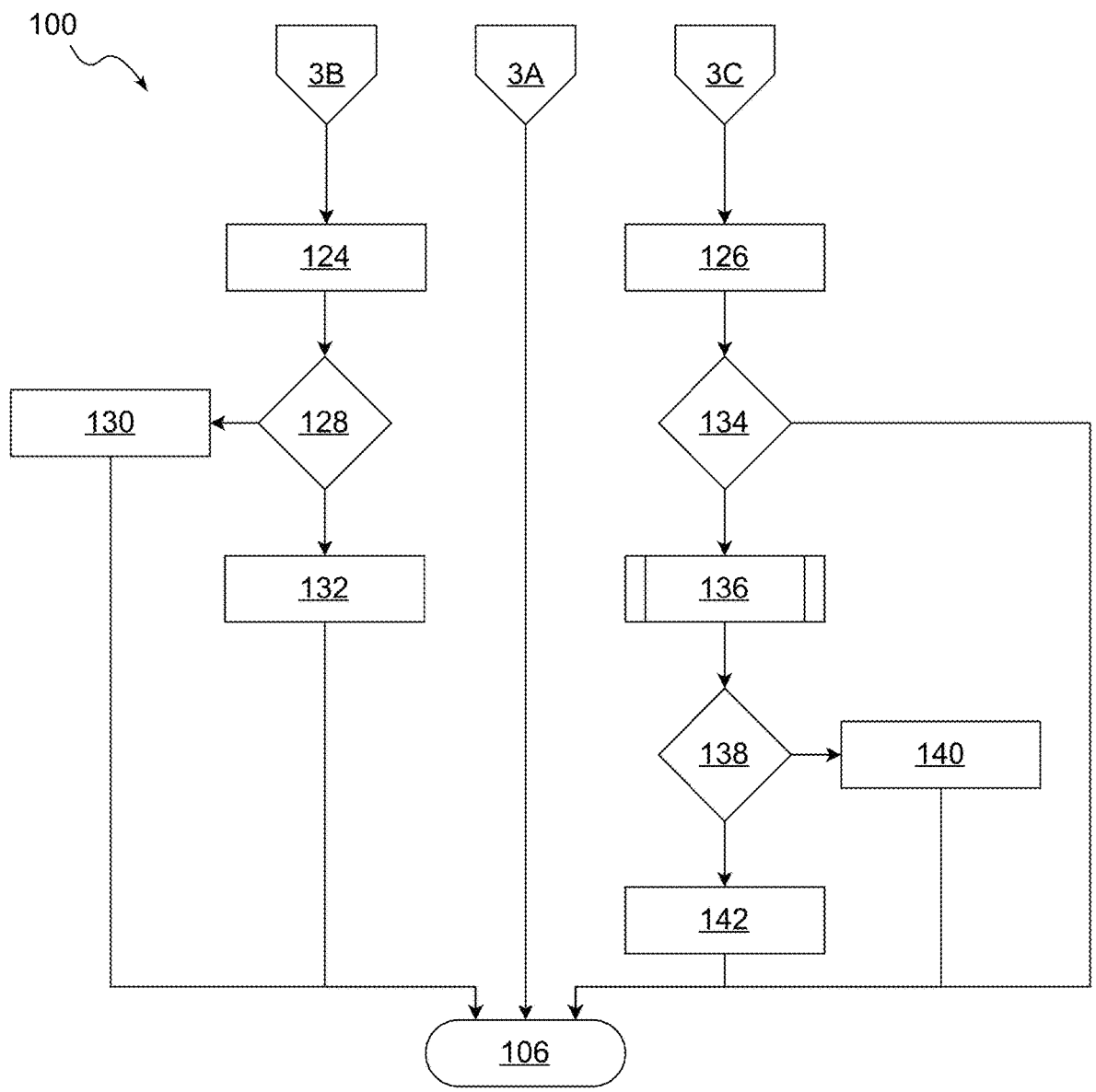
FIG. 3 is a continuation of the flowchart of FIG. 2 of the method for controlling an auxiliary power module (APM) contactor for a vehicle, according to an exemplary embodiment.

Referring to FIG. 2, a flowchart of the method 100 for controlling an auxiliary power module (APM) contactor for a vehicle is provided. The method 100 begins at block 102 and proceeds to block 104. At block 104, the controller 14 receives a request to actuate the APM contactor 18. In the scope of the present disclosure, an actuation of the APM contactor 18 includes any switching of the APM contactor 18, including from an off-state to an on-state or from the on-state to the off-state. In an exemplary embodiment, the request is received from one or more of the auxiliary battery 22 and/or the low-voltage vehicle accessory 24. In a non-limiting example, the request is received because the auxiliary battery 22 is determined to require charging. In another non-limiting example, the request is received because the low-voltage vehicle accessory 24 has been activated by an occupant of the vehicle 12 or by the controller 14. If no request to actuate the APM contactor 18 is received, the method 100 proceeds to enter a standby state at block 106 (FIG. 3, via off-page connector 3A). If a request to actuate the APM contactor 18 is received, the method 100 proceeds to block 108.

At block 108, the controller 14 actuates the APM contactor 18 according to the request received at block 104. In a non-limiting example, the controller 14 actuates the APM contactor 18 from the off-state to the on-state. In another non-limiting example, the controller 14 actuates the APM contactor 18 from the on-state to the off-state. After block 108, the method 100 proceeds to block 110.

At block 110, the controller 14 increments a total actuation count variable in the non-transitory media 28 of the controller 14. In the scope of the present disclosure, the total actuation count variable is used to store a total quantity (i.e., number) of actuations of the APM contactor 18 performed within a given time step. In the scope of the present disclosure, the time step is a predetermined length of time (e.g., one day). In an exemplary embodiment, after the conclusion of each time step, the total actuation count variable is reset to zero. After block 110, the method 100 proceeds to block 112.

At block 112, the controller 14 categorizes the actuation of the APM contactor 18 performed at block 108. In an exemplary embodiment, the actuation of the APM contactor 18 performed at block 108 is categorized as one of a plurality of auxiliary battery charging actuations or one of a plurality of accessory actuations. In the scope of the present disclosure, an auxiliary battery charging actuation is an actuation performed for the purpose of controlling charging of the auxiliary battery 22 (i.e., beginning or ending a charging process). An accessory actuation is an actuation performed for the purpose of providing power to the low-voltage vehicle accessory 24.

In an exemplary embodiment, the actuation of the APM contactor 18 performed at block 108 is categorized based on information saved in the media 28 of the controller 14 which indicates the source of the request received at block 104 (e.g., one or more flag bits). In a non-limiting example, if the APM contactor 18 was actuated to charge the auxiliary battery 22, the actuation is categorized as an auxiliary battery charging actuation. Otherwise, the actuation is categorized as an accessory actuation. In another exemplary embodiment, the actuation of the APM contactor 18 performed at block 108 is categorized based on measurement of current flow to/from the auxiliary battery 22 and the low-voltage vehicle accessory 24 to determine the primary consumer of energy. If the actuation of the APM contactor 18 performed at block 108 is categorized as one of the plurality of auxiliary battery charging actuations, the method 100 proceeds to block 114. If the actuation of the APM contactor 18 performed at block 108 is categorized as one of the plurality of accessory actuations, the method 100 proceeds to block 116.

At block 114, the controller 14 increments an auxiliary battery charging actuation count variable in the non-transitory media 28 of the controller 14. In the scope of the present disclosure, the auxiliary battery charging actuation count variable is used to store a total quantity (i.e., number) of the plurality of auxiliary battery charging actuations performed within a given time step. In the scope of the present disclosure, the time step is a predetermined length of time (e.g., one day). In an exemplary embodiment, after the conclusion of each time step, the auxiliary battery charging actuation count variable is reset to zero. After block 114, the method 100 proceeds to block 118, as will be discussed in greater detail below.

At block 116, the controller 14 increments an accessory actuation count variable in the non-transitory media 28 of the controller 14. In the scope of the present disclosure, the accessory actuation count variable is used to store a total quantity (i.e., number) of the plurality of accessory actuations performed within a given time step. In the scope of the present disclosure, the time step is a predetermined length of time (e.g., one day). In an exemplary embodiment, after the conclusion of each time step, the accessory actuation count variable is reset to zero. After block 116, the method 100 proceeds to block 118.

At block 118, the controller 14 saves an actuation record for the actuation of the APM contactor 18 performed at block 108 in the media 28 of the controller 14. In other words, the controller 14 logs the actuation of the APM contactor 18 performed at block 108 in the media 28 of the controller 14. In the scope of the present disclosure, the actuation record includes at least a time of the actuation of the APM contactor 18 performed at block 108 (i.e., an actuation time) and an actuation categorization of the actuation of the APM contactor 18 performed at block 108. The actuation categorization is one of: an auxiliary battery charging actuation or an accessory actuation, as determined at block 112. In an exemplary embodiment, the actuation record further includes the current value of the total actuation count variable, the auxiliary battery charging actuation count variable, and the accessory actuation count variable. In another exemplary embodiment, the actuation record further includes a length and/or time remaining in the current time step. After block 118, the method 100 proceeds to block 120.

At block 120, the controller 14 determines an accessory actuation trend. In the scope of the present disclosure, the accessory actuation trend is a trend (i.e., a change over time) of the quantity of the plurality of accessory actuations over multiple time steps. In an exemplary embodiment, the accessory actuation trend is represented as a running total of the quantity of the plurality of accessory actuations performed during each time step. In a non-limiting example, if the time step length is one day, the accessory actuation trend will include multiple data points including a first data point representing a sum of the quantity of the plurality of accessory actuations performed on a first day and all previous days, a second data point representing a sum of the first data point and the quantity of the plurality of accessory actuations performed on a second day, and so on for thirty days. In another exemplary embodiment, the accessory actuation trend is represented as the quantity of the plurality of accessory actuations performed during each time step. In a non-limiting example, if the time step length is one day, the accessory actuation trend will include multiple data points representing the quantity of the plurality of accessory actuations performed on each day for the preceding thirty days.

In an exemplary embodiment, the accessory actuation trend is determined using mathematical/statistical data analysis of a plurality of actuation records (discussed above in reference to block 118) saved in the media 28 of the controller 14. It should be understood that the data analysis of the actuation records may include operations such as outlier detection and filtering, normalization, and/or additional data filtering or cleaning techniques. After block 120, the method 100 proceeds to block 122.

At block 122, the controller 14 compares the accessory actuation trend determined at block 120 to a predetermined accessory actuation threshold. In the scope of the present disclosure, the predetermined accessory actuation threshold includes a predetermined expected accessory actuation trend. The predetermined expected accessory actuation trend is an expected trend of the quantity of the plurality of accessory actuations over multiple time steps, assuming that the APM contactor 18 is used within the boundaries of the APM contactor design limits.

In a non-limiting example, if the APM contactor design limits result in an expected total daily actuation quantity of twenty actuations and five actuations are allocated for charging of the auxiliary battery 22, the predetermined expected accessory actuation trend will include fifteen accessory actuations per day, beginning from, for example, the production date of the vehicle 12. In a non-limiting example, if the time step length is one day, the predetermined expected accessory actuation trend will include multiple data points including a first data point representing a sum of the quantity of the plurality of accessory actuations expected on a first day and all previous days, a second data point representing a sum of the first data point and the quantity of the plurality of accessory actuations expected on a second day (i.e., fifteen accessory actuations), and so on for thirty days. In an exemplary embodiment, the predetermined expected accessory actuation trend is predetermined based on the APM contactor design limits and stored in the media 28 of the controller 14.

In an exemplary embodiment, if an accessory actuation trendline defined by the multiple data points of the accessory actuation trend determined at block 120 is above (i.e., greater than) an expected accessory actuation trendline defined by the multiple data points of the predetermined expected accessory actuation trend for at least a predetermined quantity of time steps (wherein the predetermined quantity is greater than or equal to zero time steps), the method 100 proceeds to block 124 (FIG. 3 via off-page connector 3B). If the accessory actuation trendline is not above the expected accessory actuation trendline for at least the predetermined quantity of time steps, the method 100 proceeds to block 126 (FIG. 3 via off-page connector 3C). In some embodiments, a buffer amount may also be included, such that the accessory actuation trendline must be at least the buffer amount above the expected accessory actuation trendline for at least the predetermined quantity of time steps for the method 100 to proceed to block 124.

In an exemplary embodiment, the operations of block 122 as described above are only performed after a predetermined quantity of time steps (e.g., thirty time steps) have elapsed to allow for a larger dataset for more data points in the accessory actuation trend. In a non-limiting example, if the predetermined quantity of time steps has not been reached, the method 100 restarts at block 102 and does not perform the operations of block 122 until the predetermined quantity of time steps have elapsed.

Referring to FIG. 3, a continuation of the flowchart of FIG. 2 of the method 100 for controlling an auxiliary power module (APM) contactor for a vehicle is shown. At block 124, the controller 14 predicts a period of high actuation frequency based at least in part on the plurality of actuation records (discussed above in reference to block 118) saved in the media 28 of the controller 14. In an exemplary embodiment, the controller 14 analyzes the plurality of actuation records to identify a pattern of a high quantity of actuations within a certain time window. In a non-limiting example, the controller 14 identifies a pattern of a high quantity of actuations between 6:00-8:00 PM, Monday-Friday. Therefore, the period of high actuation frequency is determined to begin at 6:00 PM and end at 8:00 PM every Monday-Friday. It should be understood that the controller 14 may use any combination of mathematical, statistical, and/or machine learning based methods to analyze the plurality of actuation records and identify the period of high actuation frequency. After block 124, the method 100 proceeds to block 128.

At block 128, if a current time is not within the period of high actuation frequency determined at block 124, the method 100 proceeds to block 130. If the current time is within the period of high actuation frequency determined at block 124, the method 100 proceeds to block 132, as will be discussed in greater detail below.

At block 130, the controller 14 controls the APM contactor 18 with a default off-state control method. In an exemplary embodiment, the default off-state control method includes actuating the APM contactor 18 to the off-state unless a specific request is received at block 104 to actuate the APM contactor 18 to the on-state. In other words, the APM contactor 18 is allowed to actuate according to requests received at block 104 without restriction. After block 130, the method 100 proceeds to enter the standby state at block 106.

At block 132, the controller 14 actuates the APM contactor 18 to the on-state in response to determining that the current time is within the period of high actuation frequency determined at block 124. In an exemplary embodiment, the APM contactor 18 is actuated to the on-state at a beginning of the period of high actuation frequency and actuated to the off-state at an end of the period of high actuation frequency. Therefore, the APM contactor 18 is constantly in the on-state during the period of high actuation frequency, effectively restricting future accessory actuations and reducing a quantity of actuations of the APM contactor 18. After block 132, the method 100 proceeds to enter the standby state at block 106.

At block 126, the controller 14 determines a total actuation trend. In the scope of the present disclosure, the total actuation trend is a trend (i.e., a change over time) of the quantity of the plurality of actuations over multiple time steps. In an exemplary embodiment, the total actuation trend is represented as a running total of the quantity of the plurality of actuations performed during each time step. In a non-limiting example, if the time step length is one day, the total actuation trend will include multiple data points including a first data point representing a sum of the quantity of the plurality of actuations performed on a first day and all previous days, a second data point representing a sum of the first data point and the quantity of the plurality of actuations performed on a second day, and so on for thirty days. In another exemplary embodiment, the total actuation trend is represented as the quantity of the plurality of actuations performed during each time step. In a non-limiting example, if the time step length is one day, the total actuation trend will include multiple data points representing the quantity of the plurality of actuations performed on each day for the preceding thirty days.

In an exemplary embodiment, the total actuation trend is determined using mathematical/statistical data analysis of the plurality of actuation records (discussed above in reference to block 118) saved in the media 28 of the controller 14. It should be understood that the data analysis of the actuation records may include operations such as outlier detection and filtering, normalization, and/or additional data filtering or cleaning techniques. After block 126, the method 100 proceeds to block 134.

At block 134, the controller 14 compares the total actuation trend determined at block 126 to a predetermined total actuation threshold. In the scope of the present disclosure, the predetermined total actuation threshold includes a predetermined expected total actuation trend. The predetermined expected total actuation trend is an expected trend of the quantity of the plurality of actuations over multiple time steps, assuming that the APM contactor 18 is used within the boundaries of the APM contactor design limits.

In a non-limiting example, if the APM contactor design limits result in an expected total daily actuation quantity of twenty actuations, the predetermined expected total actuation trend will include twenty accessory actuations per day, beginning from, for example, the production date of the vehicle 12. In a non-limiting example, if the time step length is one day, the predetermined expected total actuation trend will include multiple data points including a first data point representing a sum of the quantity of the plurality of actuations expected on a first day and all previous days, a second data point representing a sum of the first data point and the quantity of the plurality of actuations expected on a second day (i.e., twenty actuations), and so on for thirty days. In an exemplary embodiment, the predetermined expected total actuation trend is predetermined based on the APM contactor design limits and stored in the media 28 of the controller 14.

In an exemplary embodiment, if a total actuation trendline defined by the multiple data points of the total actuation trend determined at block 126 is above (i.e., greater than) an expected total actuation trendline defined by the multiple data points of the predetermined expected total actuation trend for at least a predetermined quantity of time steps (wherein the predetermined quantity is greater than or equal to zero time steps), the method 100 proceeds to block 136. If the total actuation trendline is not above the expected total actuation trendline for at least the predetermined quantity of time steps, the method 100 proceeds to enter the standby state at block 106. In some embodiments, a buffer amount may also be included, such that the total actuation trendline must be at least the buffer amount above the expected total actuation trendline for at least the predetermined quantity of time steps for the method 100 to proceed to block 136.

At block 136, the controller 14 estimates a quantity of estimated auxiliary battery charging actuations within the time step, as will be discussed in greater detail below. After block 136, the method 100 proceeds to block 138.

At block 138, the controller 14 compares the quantity of estimated auxiliary battery charging actuations determined at block 136 to a quantity of available auxiliary battery charging actuations. In the scope of the present disclosure, the quantity of available auxiliary battery charging actuations is determined based at least in part on the quantity of the plurality of accessory actuations, the expected lifespan of the APM contactor, and the maximum actuation quantity of the APM contactor. In a non-limiting example, if the APM contactor design limits result in an expected total daily actuation quantity of twenty actuations and the quantity of the plurality of accessory actuations performed this day is fifteen actuations, then the quantity of available auxiliary battery charging actuations is five actuations. If the quantity of estimated auxiliary battery charging actuations is less than the quantity of available auxiliary battery charging actuations, the method 100 proceeds to block 140. If the quantity of estimated auxiliary battery charging actuations is greater than the quantity of available auxiliary battery charging actuations, the method 100 proceeds to block 142, as will be discussed in greater detail below.

At block 140, the controller 14 controls the APM contactor 18 with the default off-state control method. In an exemplary embodiment, the default off-state control method includes actuating the APM contactor 18 to the off-state unless a specific request is received at block 104 to actuate the APM contactor 18 to the on-state. In other words, the APM contactor 18 is allowed to actuate according to requests received at block 104 without restriction. After block 140, the method 100 proceeds to enter the standby state at block 106.

At block 142, the controller 14 actuates the APM contactor 18 to the on-state, effectively restricting future auxiliary battery charging actuations. Therefore, the APM contactor 18 is constantly in the on-state, reducing the quantity of actuations of the APM contactor 18. After block 142, the method 100 proceeds to enter the standby state at block 106.

In an exemplary embodiment, the controller 14 repeatedly exits the standby state 106 and restarts the method 100 at block 102. In a non-limiting example, the controller 14 exits the standby state 106 and restarts the method 100 on a timer, for example, every three hundred milliseconds.

Figure 4:
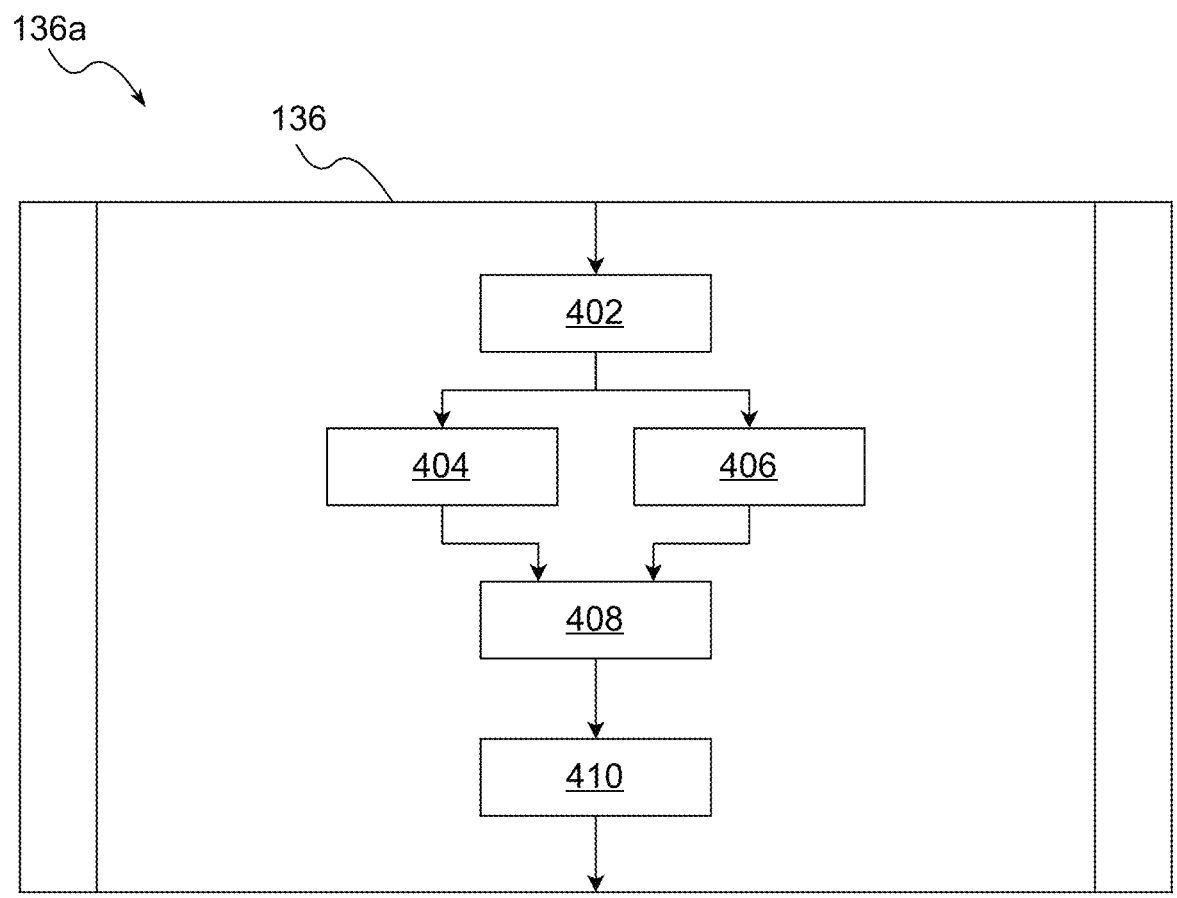
FIG. 4 is a flowchart of a method for estimating a quantity of estimated auxiliary battery charging actuations within a time step, according to an exemplary embodiment.

Referring to FIG. 4, a flowchart of an exemplary embodiment 136a of block 136 (i.e., a method for estimating a quantity of estimated auxiliary battery charging actuations within the time step) is shown. The exemplary embodiment 136a begins at block 402. At block 402, the controller 14 uses the auxiliary battery temperature sensor 30 to measure a battery temperature of the auxiliary battery 22. After block 402, the exemplary embodiment 136a proceeds to blocks 404 and 406.

At block 404, the controller 14 determines an effective energy capacity of the auxiliary battery 22 based at least in part on the battery temperature measured at block 402. In an exemplary embodiment, the effective energy capacity is related to a state of health (SOH) of the auxiliary battery 22 and thus an age of the auxiliary battery 22. The effective energy capacity is also related to the battery temperature. In a non-limiting example, the effective capacity is inversely related to the battery temperature. In an exemplary embodiment, to determine the effective energy capacity, the controller 14 uses a predetermined lookup table stored in the media 28 of the controller 14 which stores the relationship between battery temperature, battery age, and effective energy capacity. After block 404, the exemplary embodiment 136a proceeds to block 408, as will be discussed in greater detail below.

At block 406, the controller 14 determines an estimated energy draw from the auxiliary battery 22 during the time step. In the scope of the present disclosure, the estimated energy draw is an estimated amount of energy discharged from the auxiliary battery 22 during one time step (e.g., one day). In a non-limiting example, energy may be discharged from the auxiliary battery 22 to power the low-voltage vehicle accessory 24 and/or additional vehicle systems. In another non-limiting example, energy may be discharged from the auxiliary battery 22 to provide heating of the traction battery 16 and/or the auxiliary battery 22. Therefore, in a non-limiting example, the estimated energy draw may be related to the battery temperature measured at block 402. In an exemplary embodiment, to determine the estimated energy draw, the controller 14 measures the current flow to/from the auxiliary battery 22 and extrapolates the measurement over the length of the time step. After block 406, the exemplary embodiment 136a proceeds to block 408.

At block 408, the controller 14 determines an estimated charge cycle of the auxiliary battery 22. In the scope of the present disclosure, the estimated charge cycle is a periodic curve which estimates a timing of charging and discharging of the auxiliary battery 22. In an exemplary embodiment, the estimated charge cycle is characterized by a charge cycle duty cycle and a charge cycle period. The charge cycle period is the period (i.e., the inverse of the frequency) of the periodic estimated charge cycle curve. The charge cycle duty cycle indicates a percentage of the charge cycle period for which the auxiliary battery 22 is estimated to be charging. In an exemplary embodiment, to determine the estimated charge cycle, the controller 14 estimates how often and for how long the auxiliary battery 22 will need to be charged based on the effective energy capacity of the auxiliary battery 22 determined at block 404 and the estimated energy draw from the auxiliary battery 22 determined at block 406. After block 408, the exemplary embodiment 136a proceeds to block 410.

At block 410, the controller 14 estimates the quantity of estimated auxiliary battery charging actuations within the time step based at least in part on the charge cycle duty cycle and/or the charge cycle period. In an exemplary embodiment, the quantity of estimated auxiliary battery charging actuations within the time step is equal to the frequency of the estimated charge cycle (i.e., the inverse of the charge cycle period) multiplied by the ratio of the time step to the charge cycle period. It should be understood that additional methods for estimating the quantity of estimated auxiliary battery charging actuations within the time step based at least in part on the charge cycle duty cycle and/or the charge cycle period are within the scope of the present disclosure. After block 410, the exemplary embodiment 136a is concluded, and the method 100 proceeds as discussed above.

The system 10 and method 100 of the present disclosure offer several advantages. Using the system 10 and method 100, actuation of the APM contactor 18 is limited based on the design limits of the APM contactor 18, mitigating premature wear or failure of the APM contactor 18. Furthermore, limiting of APM contactor actuations is performed dynamically based on detected high-use periods. Long-term trends are analyzed to determine whether actuation of the APM contactor 18 should be limited, allowing for short-term periods of elevated use without interruption of the occupant experience. Additionally, the system 10 and method 100 allow for differentiation between actuations for the purpose of operating vehicle accessories and actuations for the purpose of charging the auxiliary battery 22.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for controlling an auxiliary power module (APM) contactor for a vehicle, the method comprising:
   logging a plurality of actuations of the APM contactor within a time step, wherein the plurality of actuations includes a plurality of auxiliary battery charging actuations and a plurality of accessory actuations, wherein logging each of the plurality of actuations of the APM contactor further comprises:
   detecting an actuation of the APM contactor;
   incrementing a total actuation count variable in a non-transitory memory in response to detecting the actuation of the APM contactor;
   categorizing the actuation of the APM contactor in response to detecting the actuation of the APM contactor, wherein the actuation of the APM contactor is categorized as one of the plurality of auxiliary battery charging actuations or one of the plurality of accessory actuations;
   incrementing an auxiliary battery charging actuation count variable in the non-transitory memory in response to categorizing the actuation of the APM contactor as one of the plurality of auxiliary battery charging actuations, wherein the auxiliary battery charging actuation count variable stores a quantity of the plurality of auxiliary battery charging actuations; and
   incrementing an accessory actuation count variable in the non-transitory memory in response to categorizing the actuation of the APM contactor as one of the plurality of accessory actuations, wherein the accessory actuation count variable stores the quantity of the plurality of accessory actuations;
   saving an actuation record in the non-transitory memory in response to categorizing the actuation of the APM contactor, wherein the actuation record includes an actuation time and an actuation categorization;
   comparing a quantity of the plurality of accessory actuations to a predetermined accessory actuation threshold; and
   restricting future actuations of the APM contactor in response to determining that the quantity of the plurality of accessory actuations is greater than or equal to the predetermined accessory actuation threshold;
   determining a total actuation trend, wherein the total actuation trend is a trend of a quantity of the plurality of actuations over multiple time steps;
   comparing the total actuation trend to a predetermined total actuation threshold, wherein the predetermined total actuation threshold includes a predetermined expected total actuation trend, wherein the predetermined expected total actuation trend is determined based at least in part on an expected lifespan of the APM contactor and a maximum actuation quantity of the APM contactor; and restricting future accessory actuations and future auxiliary battery charging actuations in response to determining that the total actuation trend is greater than or equal to the predetermined expected total actuation trend.

2. The method of claim 1, wherein restricting future actuations of the APM contactor further comprises:

predicting a period of high actuation frequency based at least in part on a plurality of actuation records in the non-transitory memory;

actuating the APM contactor to an on-state at a beginning of the period of high actuation frequency; and actuating the APM contactor to an off-state at an end of the period of high actuation frequency, such that the APM contactor is constantly in the on-state during the period of high actuation frequency.

3. The method of claim 1, wherein categorizing the actuation of the APM contactor further comprises:

categorizing the actuation of the APM contactor as one of plurality of auxiliary battery charging actuations in response to determining that the APM contactor was actuated to charge an auxiliary battery of the vehicle; and categorizing the actuation of the APM contactor as one of the plurality of accessory actuations in response to determining that the APM contactor was not actuated to charge the auxiliary battery of the vehicle.

4. The method of claim 1, wherein comparing the quantity of the plurality of accessory actuations to the predetermined accessory actuation threshold further comprises:

determining an accessory actuation trend, wherein the accessory actuation trend is a trend of the quantity of the plurality of accessory actuations over multiple time steps;

comparing the accessory actuation trend to the predetermined accessory actuation threshold, wherein the predetermined accessory actuation threshold includes a predetermined expected accessory actuation trend, wherein the predetermined expected accessory actuation trend is determined based at least in part on an expected lifespan of the APM contactor and a maximum actuation quantity of the APM contactor; and determining the quantity of the plurality of accessory actuations to be greater than or equal to the predetermined accessory actuation threshold in response to determining that the accessory actuation trend is greater than or equal to the predetermined expected accessory actuation trend.

5. The method of claim 1, further comprising:

calculating a quantity of available auxiliary battery charging actuations within the time step based at least in part on the quantity of the plurality of accessory actuations, an expected lifespan of the APM contactor, and a maximum actuation quantity of the APM contactor;

estimating a quantity of estimated auxiliary battery charging actuations within the time step;

comparing the quantity of available auxiliary battery charging actuations to the quantity of estimated auxiliary battery charging actuations; and restricting future auxiliary battery charging actuations in response to determining that the quantity of available auxiliary battery charging actuations is less than the quantity of estimated auxiliary battery charging actuations.

6. The method of claim 5, wherein estimating the quantity of estimated auxiliary battery charging actuations within the time step further comprises:

measuring a battery temperature of an auxiliary battery of the vehicle;

determining an estimated energy draw from the auxiliary battery during the time step;

determining an effective energy capacity of the auxiliary battery based at least in part on the battery temperature;

determining an estimated charge cycle of the auxiliary battery, wherein the estimated charge cycle is characterized by a charge cycle duty cycle and a charge cycle period; and estimating the quantity of estimated auxiliary battery charging actuations within the time step based at least in part on the charge cycle duty cycle and the charge cycle period.

7. The method of claim 5, wherein restricting future auxiliary battery charging actuations further comprises:

actuating the APM contactor to an on-state, such that the APM contactor is constantly in the on-state.

8. A system for controlling an auxiliary power module (APM) contactor for a vehicle, the system comprising:

a traction battery;

an APM contactor in electrical communication with the traction battery;

an auxiliary battery;

a low-voltage vehicle accessory;

an auxiliary power module (APM) in electrical communication with the APM contactor, the auxiliary battery, and the low-voltage vehicle accessory, wherein the APM is configured to convert a high-voltage provided by the traction battery to a low-voltage for use by the auxiliary battery and the low-voltage vehicle accessory; and a controller in electrical communication with the APM contactor, wherein the controller programmed to:

log a plurality of actuations of the APM contactor within a time step, wherein the plurality of actuations includes a plurality of auxiliary battery charging actuations to charge the auxiliary battery and a plurality of accessory actuations to power the low-voltage vehicle accessory, wherein to log the plurality of actuations of the APM contactor, the controller is further programmed to:

detect an actuation of the APM contactor;

increment a total actuation count variable in a non-transitory memory in response to detecting the actuation of the APM contactor;

categorize the actuation of the APM contactor in response to detecting the actuation of the APM contactor, wherein the actuation of the APM contactor is categorized as one of plurality of auxiliary battery charging actuations or one of the plurality of accessory actuations;

increment an auxiliary battery charging actuation count variable in the non-transitory memory in response to categorizing the actuation of the APM contactor as one of the plurality of auxiliary battery charging actuations, wherein the auxiliary battery charging actuation count variable stores a quantity of the plurality of auxiliary battery charging actuations;

increment an accessory actuation count variable in the non-transitory memory in response to categorizing the actuation of the APM contactor as one of the plurality of accessory actuations, wherein the accessory actuation count variable stores the quantity of the plurality of accessory actuations; and save an actuation record in the non-transitory memory in response to categorizing the actuation of the APM contactor, wherein the actuation record includes an actuation time and an actuation categorization;

compare a quantity of the plurality of accessory actuations to a predetermined accessory actuation threshold; and restrict future actuations of the APM contactor in response to determining that the quantity of the plurality of accessory actuations is greater than or equal to the predetermined accessory actuation threshold.

9. The system of claim 8, wherein to restrict future actuations of the APM contactor, the controller is further programmed to:

predict a period of high actuation frequency based at least in part on a plurality of actuation records in the non-transitory memory;

actuate the APM contactor to an on-state at a beginning of the period of high actuation frequency; and actuate the APM contactor to an off-state at an end of the period of high actuation frequency, such that the APM contactor is constantly in the on-state during the period of high actuation frequency.

10. The system of claim 9, wherein to compare the quantity of the plurality of accessory actuations to the predetermined accessory actuation threshold, the controller is further programmed to:

determine an accessory actuation trend, wherein the accessory actuation trend is a trend of the quantity of the plurality of accessory actuations over multiple time steps;

compare the accessory actuation trend to the predetermined accessory actuation threshold, wherein the predetermined accessory actuation threshold includes a predetermined expected accessory actuation trend, wherein the predetermined expected accessory actuation trend is determined based at least in part on an expected lifespan of the APM contactor and a maximum actuation quantity of the APM contactor; and determine the quantity of the plurality of accessory actuations to be greater than or equal to the predetermined accessory actuation threshold in response to determining that the accessory actuation trend is greater than or equal to the predetermined expected accessory actuation trend.

11. The system of claim 10, wherein the controller is further programmed to:

calculate a quantity of available auxiliary battery charging actuations within the time step based at least in part on the quantity of the plurality of accessory actuations, an expected lifespan of the APM contactor, and a maximum actuation quantity of the APM contactor;

estimate a quantity of estimated auxiliary battery charging actuations within the time step;

compare the quantity of available auxiliary battery charging actuations to the quantity of estimated auxiliary battery charging actuations; and restrict future auxiliary battery charging actuations in response to determining that the quantity of available auxiliary battery charging actuations is less than the quantity of estimated auxiliary battery charging actuations.

12. The system of claim 11, further comprising an auxiliary battery temperature sensor in electrical communication with the controller, wherein to estimate the quantity of estimated auxiliary battery charging actuations, the controller is programmed to:

measure a battery temperature of an auxiliary battery of the vehicle;

determine an estimated energy draw from the auxiliary battery during the time step;

determine an effective energy capacity of the auxiliary battery based at least in part on the battery temperature;

determine an estimated charge cycle of the auxiliary battery, wherein the estimated charge cycle is characterized by a charge cycle duty cycle and a charge cycle period; and estimate the quantity of estimated auxiliary battery charging actuations within the time step based at least in part on the charge cycle duty cycle and the charge cycle period.

13. The system of claim 12, wherein to restrict future auxiliary battery charging actuations, the controller is further programmed to:

actuate the APM contactor to an on-state, such that the APM contactor is constantly in the on-state.

14. A method for controlling an auxiliary power module (APM) contactor for a vehicle, the method comprising:

logging a plurality of actuations of the APM contactor within a time step, wherein the plurality of actuations includes a plurality of auxiliary battery charging actuations and a plurality of accessory actuations;

comparing a quantity of the plurality of accessory actuations to a predetermined accessory actuation threshold, wherein comparing the quantity of the plurality of accessory actuations to the predetermined accessory actuation threshold further comprises:

determining an accessory actuation trend, wherein the accessory actuation trend is a trend of the quantity of the plurality of accessory actuations over multiple time steps;

comparing the accessory actuation trend to the predetermined accessory actuation threshold, wherein the predetermined accessory actuation threshold includes a predetermined expected accessory actuation trend, wherein the predetermined expected accessory actuation trend is determined based at least in part on an expected lifespan of the APM contactor and a maximum actuation quantity of the APM contactor; and determining the quantity of the plurality of accessory actuations to be greater than or equal to the predetermined accessory actuation threshold in response to determining that the accessory actuation trend is greater than or equal to the predetermined expected accessory actuation trend;

restricting future actuations of the APM contactor in response to determining that the quantity of the plurality of accessory actuations is greater than or equal to the predetermined accessory actuation threshold;

calculating a quantity of available auxiliary battery charging actuations within the time step based at least in part on the quantity of the plurality of accessory actuations, an expected lifespan of the APM contactor, and a maximum actuation quantity of the APM contactor;

estimating a quantity of estimated auxiliary battery charging actuations within the time step;

comparing the quantity of available auxiliary battery charging actuations to the quantity of estimated auxiliary battery charging actuations; and restricting future auxiliary battery charging actuations in response to determining that the quantity of available auxiliary battery charging actuations is less than the quantity of estimated auxiliary battery charging actuations.

15. The method of claim 14, wherein estimating the quantity of estimated auxiliary battery charging actuations within the time step further comprises:
- measuring a battery temperature of an auxiliary battery of the vehicle;
- determining an estimated energy draw from the auxiliary battery during the time step;
- determining an effective energy capacity of the auxiliary battery based at least in part on the battery temperature;
- determining an estimated charge cycle of the auxiliary battery, wherein the estimated charge cycle is characterized by a charge cycle duty cycle and a charge cycle period; and
- estimating the quantity of estimated auxiliary battery charging actuations within the time step based at least in part on the charge cycle duty cycle and the charge cycle period.

* * * * *